United States Patent [19]

Hofstetter et al.

[11] Patent Number: 4,626,186
[45] Date of Patent: Dec. 2, 1986

[54] APPARATUS FOR FORMING DRUM HANDLING RINGS

[75] Inventors: Don R. Hofstetter, Montville; Louis F. Fow, Jr., Chagrin Falls, both of Ohio

[73] Assignee: Mont-Pac, Inc., Parkman, Ohio

[21] Appl. No.: 638,285

[22] Filed: Aug. 6, 1984

[51] Int. Cl.$^4$ ............................................. B29C 53/00
[52] U.S. Cl. ..................................... 425/115; 156/500; 156/503; 156/507; 156/512; 220/5 R; 220/71; 425/113; 425/308
[58] Field of Search .................. 156/406.2, 406.4, 407, 156/443, 498, 500, 503, 507, 502, 523, 425; 425/113, 115, 149, 296, 308, 377, 378 R, 402; 220/5 R, 71

[56] References Cited

U.S. PATENT DOCUMENTS

| | | | |
|---|---|---|---|
| 3,482,277 | 12/1969 | Koch | 425/308 |
| 3,873,399 | 3/1975 | Goldsworthy et al. | 156/500 |
| 4,018,468 | 4/1977 | Lundquist | 294/67 |
| 4,022,345 | 5/1977 | Butz | 220/71 |
| 4,024,979 | 5/1977 | Craig et al. | 220/71 |
| 4,088,239 | 5/1978 | Uhlig | 220/5 |
| 4,119,235 | 10/1978 | Uhlig | 220/71 |
| 4,140,236 | 2/1979 | Uhlig et al. | 220/71 |
| 4,141,680 | 2/1979 | Kauffman et al. | 425/529 |
| 4,149,648 | 4/1979 | Uhlig | 220/71 |
| 4,151,249 | 4/1979 | Lee | 264/520 |
| 4,203,526 | 5/1980 | Stoll, III | 220/71 |
| 4,242,073 | 12/1980 | Tsuchiya et al. | 425/149 |
| 4,268,474 | 5/1981 | Moertel | 425/115 |
| 4,294,374 | 10/1981 | Ames | 220/71 |
| 4,522,669 | 6/1985 | Nordin et al. | 156/503 |

Primary Examiner—Caleb Weston
Attorney, Agent, or Firm—Pearne, Gordon, Sessions, McCoy, Granger & Tilberry

[57] ABSTRACT

A method and apparatus for forming a drum handling ring having an inverted frustoconical geometry to facilitate engagement of a conventional parrot beak gripper with the ring. The end of an advancing, straight strip of heated thermoplastic material, continuously provided by an extrusion head, is fed at a first location to the circular periphery of a continuously rotating, large diameter turntable where the strip is clamped thereto and then cooled so that the clamped portion of the strip thermally sets into an arcuate shape corresponding to the periphery of the turntable. At a second location diametrically opposed to the first, the now arcuate end portion of the strip is unclamped and guided away from the turntable periphery to a cutting station where the continuously advancing strip is cut into arcuate pieces each having an arc length generally corresponding to the desired circumference of a drum handling ring. In a separate operation, the ends of each arcuate piece are butted together and then thermally welded to provide an inverted frustoconical drum handling ring having a grippable "toe" portion spaced radially outwardly from the sidewall of the associated drum to facilitate gripping thereof.

12 Claims, 11 Drawing Figures

APPARATUS FOR FORMING DRUM HANDLING RINGS

BACKGROUND OF THE INVENTION

The present invention relates in general to the manufacture of ring members of a preferred geometry and, in particular, to a method and apparatus for forming a drum or barrel handling ring having an inverted frustoconical shape to facilitate engagement of the top flange or "toe" of the ring with a conventional parrot beak gripper.

It is well known in the art of bending that a straight strip of plastic or the like, having an asymmetrical cross section, has a tendency to twist or shift out of the plane in which it is being bent due primarily to its cross section asymmetry. Upon bending, some portions of the strip are placed in tension, while other portions of the strip are placed in compression. Where the strip being bent has a symmetrical cross section, relative to the bending plane, the tension and compression forces tend to balance each other to allow undistorted planar bending of the strip. On the other hand, such tension and compression forces are unbalanced in the case of bending a strip of material having an asymmetrical cross section. Such force imbalance can result in twisting, distortion, etc. as the strip is bent, for example, into a ring member.

It is recognized that a straight, generally flat strip of thermoplastic material (having a conventional asymmetrical cross section suitable for purposes of forming a drum handling ring), when bent into a ring shape, will form a frustoconically shaped ring with its top flange or "toe" located radially inwardly of the base portion of the ring that engages and mates with a circumferential groove in the drum on which the ring is mounted. Such an "inboard toe" makes it more difficult for a conventional parrot beak gripper to engage the "toe" of the ring.

It would be desirable to form from straight strip stock a drum handling ring having an "outboard toe", i.e. a top flange or "toe" that extends radially outwardly from the base portion of the drum handling ring engaging the associated drum, whereby a conventional parrot beak gripper can easily engage the "outboard toe" of the handling ring.

SUMMARY OF THE INVENTION

In accordance with the present invention, a strip of plastic material is provided in a non-solidified or softened condition, the strip being curved to a predetermined degree out of a secondary plane B—B generally perpendicular to a primary plane A—A. The strip is solidified or hardened to a predetermined degree so that it will maintain its curved condition, and then said solidified, curved strip is bent out of said primary plane A—A to form a ring having a geometry dependent on the degree of curvature of said strip out of said secondary plane B—B.

In a preferred method, a straight strip of extruded thermoplastic material in a heated condition is provided. The extruded strip is bent to a predetermined degree of curvature out of a secondary plane B—B generally perpendicular to a primary plane A—A. The heated strip is held in its curved condition and then cooled so that it will maintain its curved condition when released. The curved, cooled strip is then bent out of said primary plane A—A to form a ring having a preferred frustoconical geometry. Such a technique has been successfully utilized in forming inverted frustoconical barrel handling rings from straight strip stock having a standard asymmetrical cross section.

A machine in accordance with the invention for practicing the above-noted method includes a rotatable turntable having retaining means located on one side thereof for retaining an advancing end portion of the plastic strip in a predetermined curved position that is radially spaced from the axis of rotation of the turntable. Cooling means solidifies the retained portion of the strip so that it will thermally set at its curved condition. The machine further includes means for cutting predetermined lengths from the curved strip as it is released from the retaining means. The cut off arcuate portions of the strip are then bent into rings having a desired frustoconical shape.

In a preferred form, the retaining means includes a plurality of cam controlled, air actuated pistons mounted on the turntable in a circular pattern. Clamping plates controlled by the pistons are sequentially raised and lowered to retain the moving strip of plastic in a curved condition. The cooling means is constituted by air blowers that direct air onto the clamped strip to cool it. The cutting means takes the form of a radial arm type circular saw blade that moves with the strip as the blade transversely cuts through it.

BRIEF DESCRIPTION OF THE DRAWINGS

A fuller understanding of the invention may be had by referring to the following description and claims taken in conjunction with the accompanying drawings, wherein:

DETAILED DESCRIPTION OF THE PREFERRED EMBODIMENT

Figure 1:
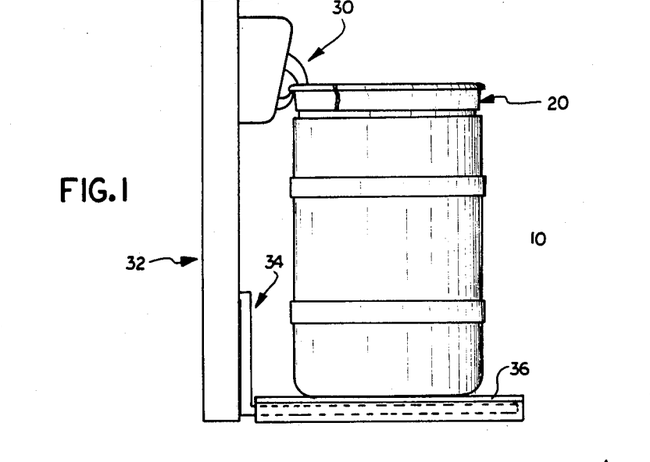
FIG. 1 is a side elevation view of a barrel or drum having a drum handling ring gripped by a conventional parrot beak gripper forming part of a barrel lifting device.

With reference to FIG. 1, there is illustrated a conventional, cylindrical barrel or drum 10 which for example can be formed by blow molded high molecular weight polyethylene plastic. Such a drum 10 typically is provided in 30 gallon and 55 gallon capacity sizes. The plastic drum 10 could also be formed from metal or other suitable compositions depending upon the intended use of the drum. Associated with the drum 10 is a circular barrel or drum handling ring 20 (also formed for example of extruded high molecular weight polyethylene plastic) which extends in chimelike fashion about the upper end of the cylindrical drum 10 as illustrated. The upper end or "toe" of the handling ring 20 can be engaged by a conventional parrot beak gripper apparatus 30 which is movably mounted to a mast structure 32 which, for example, also includes a fork mechanism 34 for engaging a pallet 36 upon which the drum 10 rests as illustrated. In many applications, the parrot beak gripper apparatus 30 acting alone can be used to lift and move the barrel 10. The general structure illustrated in FIG. 1 is well known in the art, the present invention being directed solely to the manufacture of the drum handling ring 20.

Figure 2:
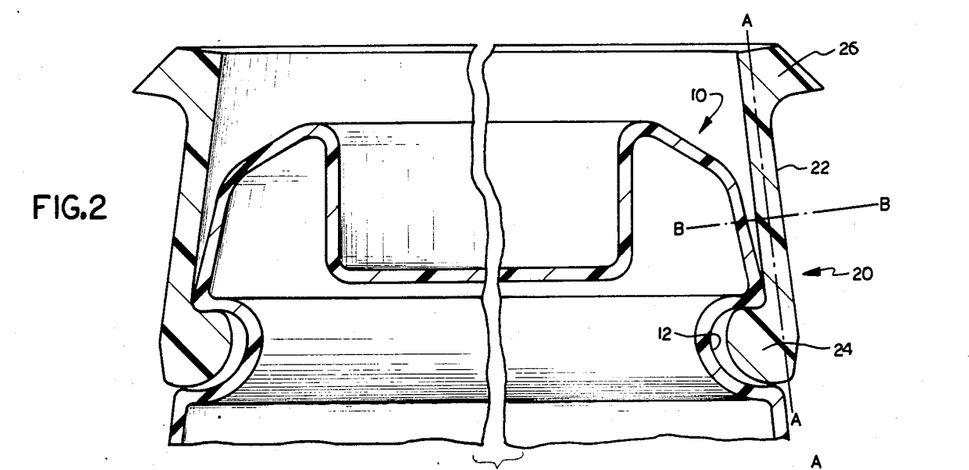
FIG. 2 is a cross section view of a drum handling ring having an undesirable geometry.

With reference to FIG. 2, the drum handling ring 20 in a non-preferred shape is illustrated in its mounted condition about the top of the barrel or drum 10. The top end of the drum 10 includes as an integral portion thereof a circumferentially extending groove 12. The chimelike barrel or drum handling ring 20 can be seen to have a generally flat cross section comprised of an intermediate flat wall 22, a lower lobelike base 24 and an upper toe 26. The lobelike base 24 extends radially inwardly towards the longitudinal axis of the cylindrical barrel 10 and fits into and mates with the circumferential groove 12 as illustrated. The upper toe 26 extends radially outwardly from the longitudinal axis of the cylindrical barrel 10 to facilitate its engagement with the parrot beak gripper 30 (see FIG. 1). It can be seen that the cross section of the ring 20 is asymmetrical relative to a primary plane A—A. Associated with the primary plane A—A and extending generally perpendicularly thereto is a secondary plane B—B.

It is to be understood that planes A—A and B—B intersect each other in generally perpendicular fashion as illustrated, and that a straight strip of plastic material lying along the intersection point of the planes A—A, B—B is used to form the ring 20, the plastic strip being bent out of the primary plane A—A to form the ring. In accordance with the invention, prior to forming the ring, the straight strip is bent to a predetermined degree out of the secondary plane B—B to provide a ring structure of preferred geometry as will be discussed subsequently. Relative to the cylindrical barrel on which the ring is mounted, it can be seen that secondary plane B—B extends across the width of the cross section of the strip forming the ring 20 and through the longitudinal axis of the barrel, while the plane A—A extends through the length of the cross section of the strip forming the ring 20.

To form the drum handling ring 20 illustrated in FIG. 2, a straight, linear strip of plastic having a length approximately equal to the desired circumference of the ring 20 is manually bent out of primary plane A—A into a ring shape, the ends of the bent, circular strip being butted and bonded together by for example thermal welding means well known in the art. It is recognized in the art that the bending of a flat, straight strip of plastic material, having the conventional asymmetrical cross section as illustrated relative to the primary axis A—A, results in a frustoconical ring as illustrated in FIG. 2. That is, the toe or upper end of the ring 20 is tapered inwardly relative to the base or bottom end thereof. Because the toe 26 of the ring is inboard, gripping of the toe by the parrot beak gripper 30 (see FIG. 1) is difficult.

Figure 3:
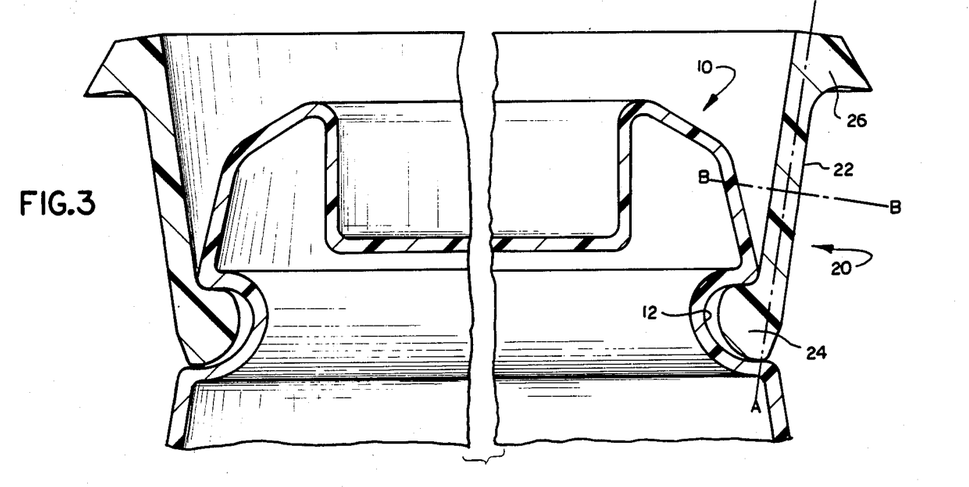
FIG. 3 is a cross section view of a drum handling ring having a preferred geometry.

With reference to FIG. 3, a more desirable geometry for the drum handling ring 20 is illustrated. It can be seen that the handling ring 20 of FIG. 3 takes the form of an inverted frustoconical shape, i.e. the toe 26 or top end of the ring 20 tapers outwardly relative to the base end 24 of the ring. In other words, the diameter of the toe 26 or top end of ring 20 of FIG. 3 is greater than the diameter of the toe 26 or top end of the ring 20 of FIG. 2 which is formed from a straight strip of bendable plastic material. The toe 26 (of FIG. 3) can be seen to extend radially outwardly from the top sidewall portion of the cylindrical barrel 10 to facilitate its engagement with a conventional parrot beak gripper. The present invention is specifically directed to the manufacture of the preferred inverted frustoconical geometry ring 20 illustrated in FIG. 3.

Figure 4:
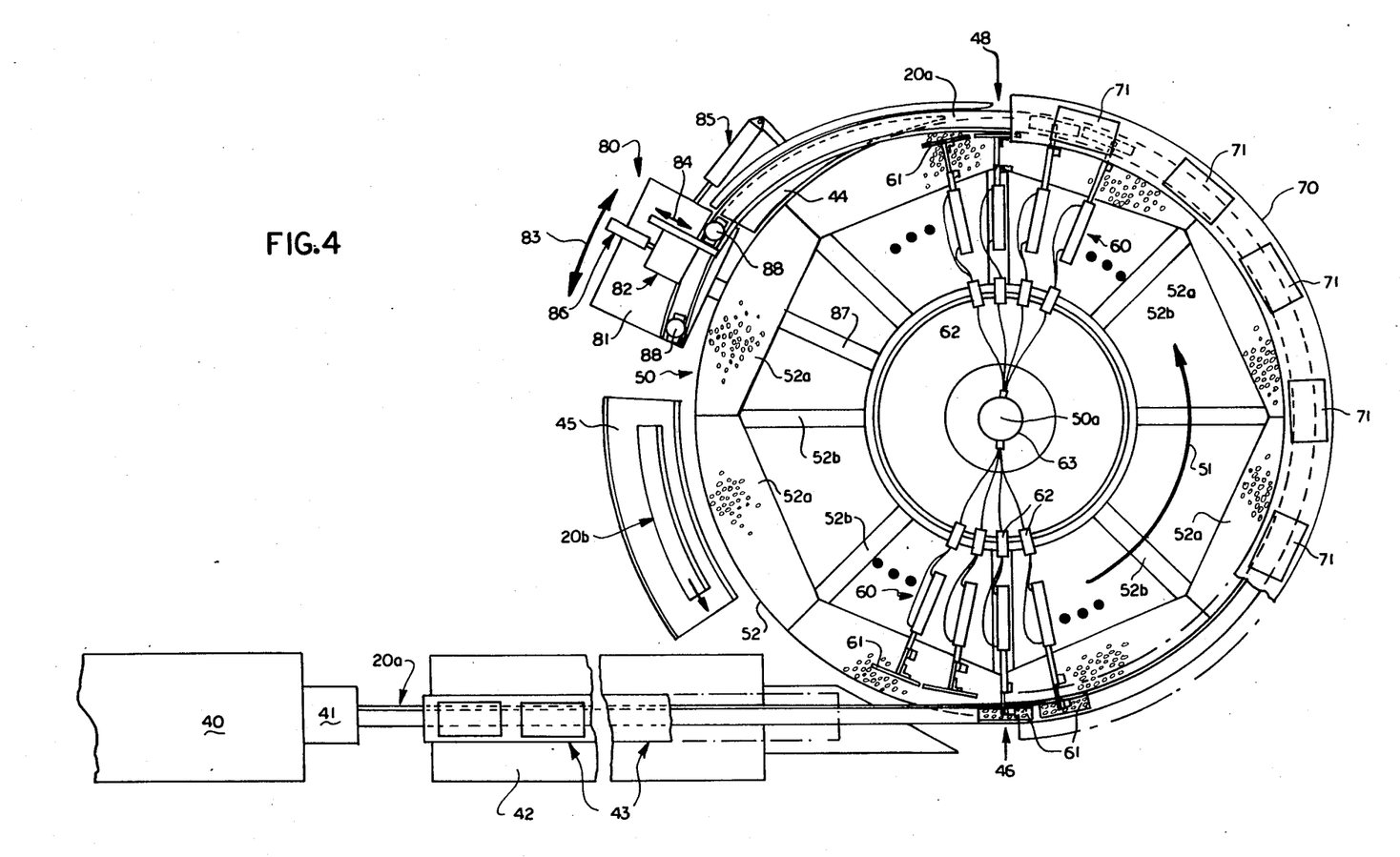
FIG. 4 is a plan view of a machine and associated apparatus for forming a drum handling ring of preferred geometry as illustrated in FIG. 3.

With reference to FIG. 4, an apparatus or machine for use in forming barrel handling rings having the preferred geometry illustrated in FIG. 3 is schematically illustrated. An extruding means 40 of conventional design includes as a part thereof an extruding head 41 which provides a heated, non-solidified or softened, straight strip of thermoplastic material 20a having a conventional, asymmetrical cross section as illustrated in FIGS. 2 and 3. The extruded strip 20a is received onto an elongated, traylike strip supporting table 42 over which is positioned a plurality of air blowers 43 for cooling down the heated strip 20a to a predetermined degree, the air blowers 43 providing cooling air streams that impinge on the adjacent strip 20a. The straight extruded strip 20a advances along its longitudinal extent from the traylike table 42 toward a fixed feed location 46. At this point the strip 20a is still in a softened, deformable condition.

A large diameter, rotatably driven, horizontal turntable 50 having a circular periphery 52, formed in part by a plurality of perforated metal plates 52a supported by cross beam members 52b, rotates in a counterclockwise direction indicated by arrow 51 so as to receive at its periphery 52, at feed location 46, the moving strip 20a of pliable thermoplastic material provided by the extrusion head 41. The table 50 rotates on a vertical axis 50a (also see FIG. 5) at a predetermined rate dependent on the rate of extrusion. The table includes, on its top side as illustrated in FIG. 4, a plurality (only a portion illustrated) of retaining means comprised of air cylinder driven clamps 60 which are equidistantly spaced in circumferential or circular fashion around the table as illustrated. In successfully practicing the present invention, 32 clamps 60 have been used on a turntable having a diameter of approximately 10 feet (only 8 clamps being illustrated in FIG. 4 for purposes of simplicity). Each of the clamps 60 includes a metal clamping plate 61 which in a preferred form is perforated or foraminous to allow air flow thereto. The clamps 60 are moved between raised and lowered conditions by an associated plurality of pneumatic controllers 62 which are cam actuated in a manner to be subsequently illustrated, the controllers 62 regulating the flow of compressed air from a compressed air manifold or plenum 63 to the clamps 60.

During operation of the apparatus illustrated in FIG. 4, at any one time, approximately one half (e.g. 16) of the clamps 60 are in a raised position while the other half (e.g. 16) are in a lowered position, the raised half of the clamps being to the left of feed point 46 (and a diametrically opposed exit point 48 as illustrated in FIG. 4) while the clamps to the right of feed point 46 (and exit point 48) are in a lowered position wherein the associated clamping plate 61 hold the advancing strip 20*a* in a predetermined curved position on the arcuate periphery 52 of the rotating turntable 50. Thus, it can be seen that the strip 20*a* is deformed or bent out of the secondary plane B—B, (see FIGS. 2, 3 and 7) to provide a predetermined degree of curvature to the extruded straight strip 20*a*. The clamps 60, in their lowered position, extend counterclockwise from the fixed feed position 46 through approximately 180° of a rotation to the fixed exit point 48 wherein the clamps 60 are sequentially raised as they arrive at the exit point 48 and remain raised until they again reach the feed point 46 wherein they sequentially return to their lowered position. While the clamped advancing end portion of the strip 20*a* is retained in position at the periphery of the turntable, a cooling means 70 in the form of a plurality of blowers 71 provide airstreams which impinge on the clamped down curved portion of the strip 20*a* to cool it and thereby solidify or harden it to a degree wherein it will thermally set so as to maintain its curved position when released by the clamps at the exit point 48.

The now thermally set, curved strip 20*a* advances from the exit location 48 to a cutting station 80. The cutting station 80 (schematically illustrated) includes a saw support 81 upon which is mounted a circular saw 82 movable radially to and away from the axis of rotation 50*a* of the turntable 50 as illustrated by radial travel arrow 84. The saw support 81 is in turn supported by a pivot arm 87 that swings to a limited degree about the axis of rotation 50*a* of the turntable 50. Thus, the cutting station 80 can arcuately move or oscillate back and forth about the axis 50*a* as illustrated by arcuate travel arrow 83. The arcuate travel of the cutting station 80*a* is provided by means of an arcuate travel drive cylinder 85, preferably of the pneumatic type, while radial travel as indicated by arrow 84 is provided by a radial travel drive means 86 in the preferred form of plural air cylinder means to be illustrated subsequently. It can be seen that the cutting station 80 is radially spaced from the periphery 52 of the turntable 50. The advancing curved strip 20*a* is guided away from the periphery 52 of the table 50 by means of an exit tray 44, to the cutting station 80. The cutting station 80 receives a predetermined length of the advancing end of the curved strip 20*a*, clamps it in position by means of a pair of cutting station clamps 88, and then moves with the strip as indicated by arrow 83 at a rate corresponding to the rate of turntable rotation. As the cutting station 80 is moving with the strip, the circular saw 82 simultaneously moves radially, as indicated by arrow 84, toward axis 50*a* wherein the strip 20*a* is transversely cut without binding of the saw blade due to simultaneous pivotal and transverse movement of the saw blade. The now cut end of the strip is pushed onto a cut piece receiving tray 45 by the continuously advancing strip 20*a* as the cutting station 80 returns to its illustrated starting position. The arcuate cut section 20*b*, when bent into a ring, and with its ends butted and bonded together, will form the inverted frustoconical drum handling ring 20 as illustrated and discussed earlier with regard to FIG. 3. It can be seen that by providing the extruded thermoplastic strip 20*a* in a non-solidified or softened condition, wherein it can be curved to a predetermined degree out of the associated secondary plane B—B (see FIGS. 2, 3 and 7), the curved strip is solidifed or hardened to a predetermined degree so that it will maintain its curved condition so that it can be bent out of the primary plane A—A (see FIGS. 2, 3 and 7) to form the drum handling ring 20 whose geometry is dependent on the degree of curvature of the strip out of the secondary plane B—B, i.e. the degree of curvature of the turntable periphery 52. Thus, unlike the prior art (FIG. 2), arcuate or curved strip section 20*b* of asymmetrical cross section is formed into a ring which has the outboard toe configuration illustrated in FIG. 3. The curvature of the strip out of the plane B—B is accomplished by clamping the advancing strip to the circular periphery of the continuously rotating turntable 50 and then cooling it while in its clamped condition so that it solidifies at least to a degree necessary to maintain its curved condition when released from the turntable at exit point 48 for advancement to the cutting station 80. The arcuate or curved strips 20*b* have an arc length approximately equal to the desired circumference of the barrel handling ring 20. The strips 20*b* can be manually bent out of the primary plane A—A into a ring shape with the ends butted together and thermally bonded by conventional thermal bonding machinery. As is well known in the art, the completed rings are subsequently heated to cause expansion thereof so that they can be dropped over the top of an associated drum, and then allowed to cool and contract wherein the base 24 of the ring is press fitted into the associated groove 12 as discussed earlier with regard to FIGS. 2 and 3.

Figure 5:
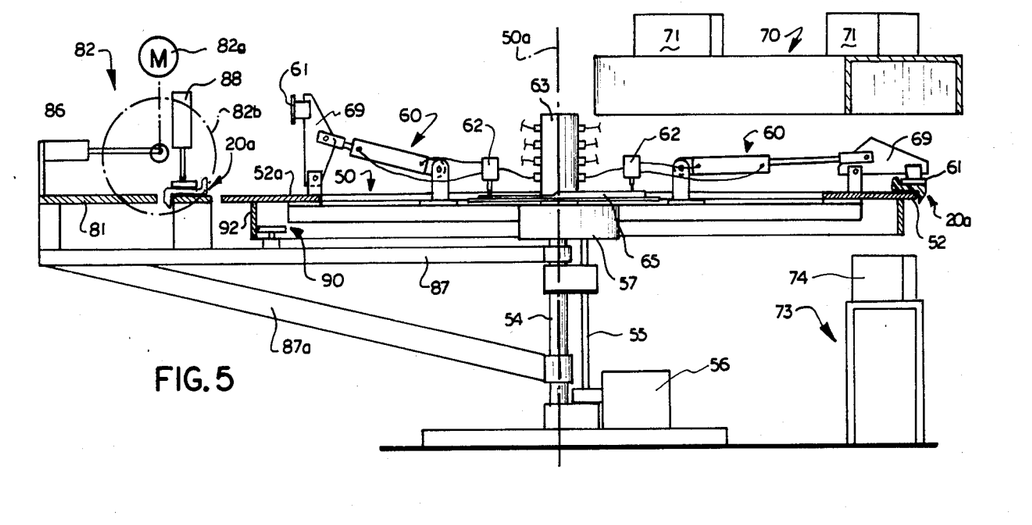
FIG. 5 is an elevational cross section view of the machine illustrated in FIG. 4.

With reference to FIG. 5, the turntable 50 is rotatably supported by a spindle 54 extending along the axis of rotation 50*a*. A rotating drive shaft 55 extends from a conventional turntable drive motor means 56 to a conventional gear drive and bearing means 57, the shaft 55, motor means 56, and drive and bearing means 57 constituting means for rotatably driving the turntable 50. Extending downwardly from the lower side or bottom side of the turntable periphery is a circularly extending flange or wall 92 that is engagable with a velocity sensor 90 of conventional design, the sensor 90 being used to control the advance of the cutting station 80 (see FIG. 3) so that it matches the rotating speed of the turntable 50. The plurality of clamps 60 each have an associated clamping plate 61 for holding the advancing strip 20*a* in position on the periphery 52 of the turntable 50 and are controlled by their respective pneumatic controllers 62 which are cam actuated by a cam ring 65 fixed in position relative to the rotating turntable 50.

Figure 6:
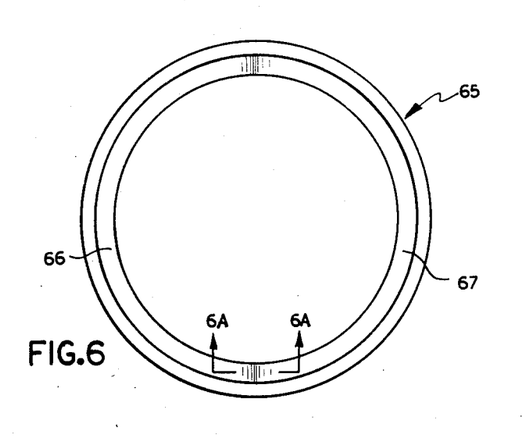
FIG. 6 is a top plan view of a cam ring incorporated into the machine of FIGS. 4 and 5.

With reference to FIG. 6, the cam ring 65 is illustrated as including a semicircular low portion or a flat 66 and a complementary semicircular high portion or lobe 67, the flat 66 extending for approximately 180° of the circular cam ring 65 while the lobe 67 extends for the remaining 180°, the diametrically opposed transition points from the flat-to-lobe and lobe-to-flat being located respectively at the fixed feed point 46 and exit point 48 as illustrated in FIG. 4.

Figure 6A:
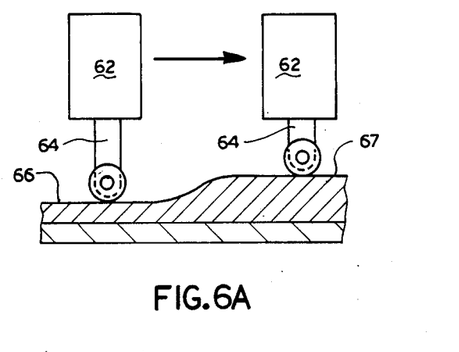
FIG. 6A is an elevation view of a cam follower mechanism associated with the cam ring illustrated in FIG. 6.

As illustrated in FIG. 6A, each controller 62 includes a linearly movable cam follower 64 that rides on the flat and lobe 66, 67 of the cam ring 65. While the cam follower 64 is riding the flat 66 of the cam ring, the associated clamp 60 is supplied with air so as to maintain the clamp plate 61 in a raised position, such air being provided to the controller 62 by means of the air supply plenum 63. When the cam follower 64 rides up onto the lobe 67 of the cam ring 65, the controller 62, in a sense, reverses the feed of air to the clamp 60 so as to lower and force down associated clamp plate 61 (see FIG. 5)

onto the strip 20a. Thus, it will be recognized that the fixed cam ring 65, in association with the moving table mounted controllers 62, causes, at any one time, approximately half of the clamps 60 to be in a raised condition while the other half are in a lowered condition, the clamps being sequentially raised and lowered at point 46, 48 (see FIG. 4) as the turntable 50 rotates as discussed earlier.

Figure 7:
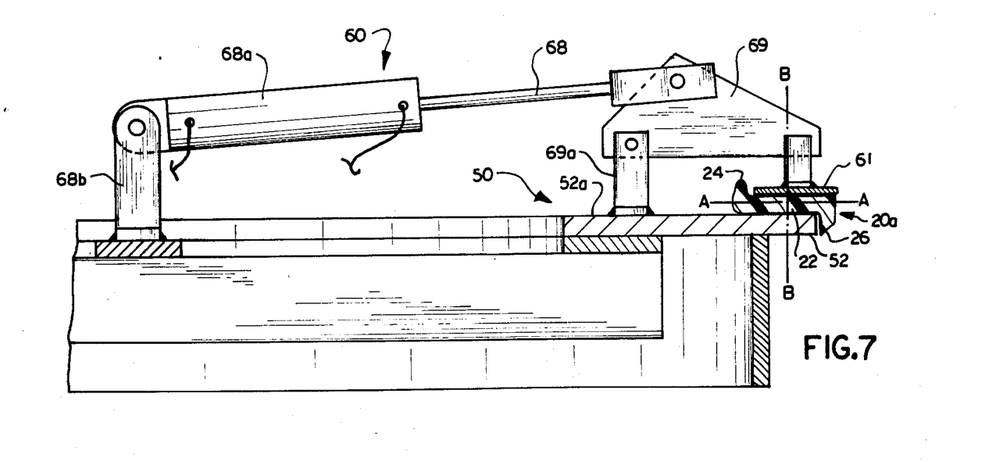
FIG. 7 is an elevation view of a clamping mechanism portion of the machine illustrated in FIGS. 4 and 5.

A better understanding of the clamp 60 can be had by reference to FIG. 7 wherein each clamp 60, functioning as a retaining means, includes a clamping plate 61 which, as noted earlier, is perforated to allow cooling air flow therethrough. The plate 61 is preferably formed of metal so as to act as a heat sink to draw heat out of the clamped strip 20a. The clamping plate 61 is located at the distal end of the lever arm 69 having its other end pivotally mounted to the top of a fulcrum point stanchion 69a extending upwardly from and fixed to the top of the turntable plate 52a. An air cylinder support stanchion 68b has pivotally mounted to its top end, one end of a cylinder 68a which has extending from its other end a piston rod 68 which is moved into and out of the cylinder 68a by means of a double acting piston (not illustrated). The distal end of the piston rod 68 is pivotally connected to the lever arm 69 at a point spaced from the fulcrum point provided by stanchion 69a so that linear movement of the piston rod 68 into and out of the cylinder 68a causes upward and downward movement of the clamping plate 61. It can be seen (FIGS. 5 and 7) that the clamping plate 61 primarily engages the intermediate flat wall 22 of the strip 20a, the base 24 extending upwardly therefrom while the toe 26 overhangs the peripheral edge 52 of the turntable 50, the plate 61 and peripheral edge 52 sandwiching a portion of the flat wall 22 of the strip 20a between them. It is to be noted that the turntable rotates at a rate such that tension is placed on the strip 20a as it advances from the extruding head 41 (see FIG. 1). Thus, the rotating turntable 50 functions not only as a means of providing a predetermined degree of curvature out of secondary plane B—B to the strip 20a but also acts as a puller relative to the extrusion means 40.

Figure 8:
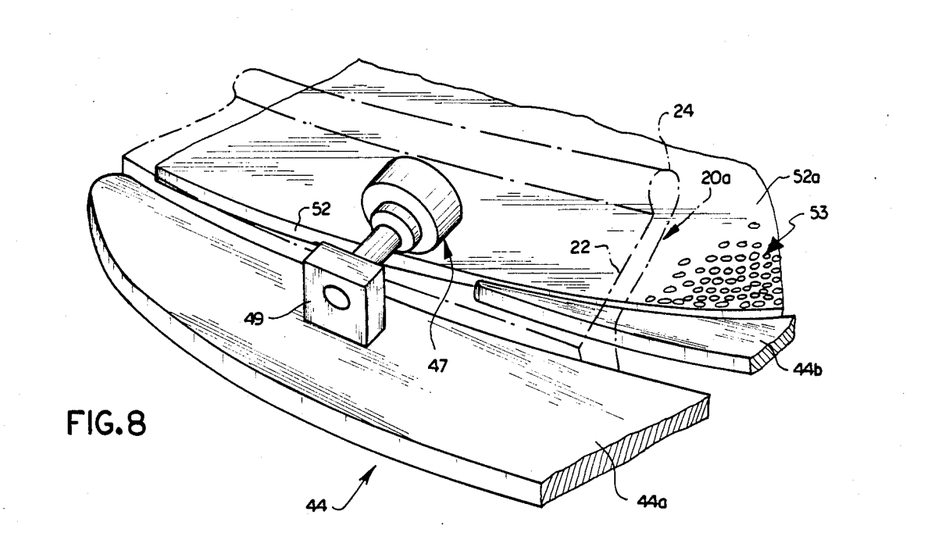
FIG. 8 is a perspective view of a guide portion of the machine illustrated in FIGS. 4 and 5.

With reference to FIG. 8, the exit tray 44 can be seen to include a first part 44a spaced from a second part 44b so as to provide a guide groove 44c which receives the toe 26 of the advancing strip 20a. A hold down roller 47 supported by a guide support stanchion 49 fixed to the first table port 44a functions to maintain the position of the strip 20a on the periphery of the turntable as it is guided away from the turntable toward the cutting station 80 as discussed earlier with regard to FIG. 4. As noted earlier, the turntable plates 52a are perforated by foramina 53 to permit air cooling thereof. Thus, with further reference to FIG. 5, additional cooling means 73 in the form of one or more blowers 74 can be positioned beneath the peripheral edge 52 of the turntable to provide additional cooling of the strip since air provided by the blower 74 will impinge on the underside of the clamped strip 20a due to the table perforations or foramina 53 as illustrated in FIG. 8.

Figure 9:
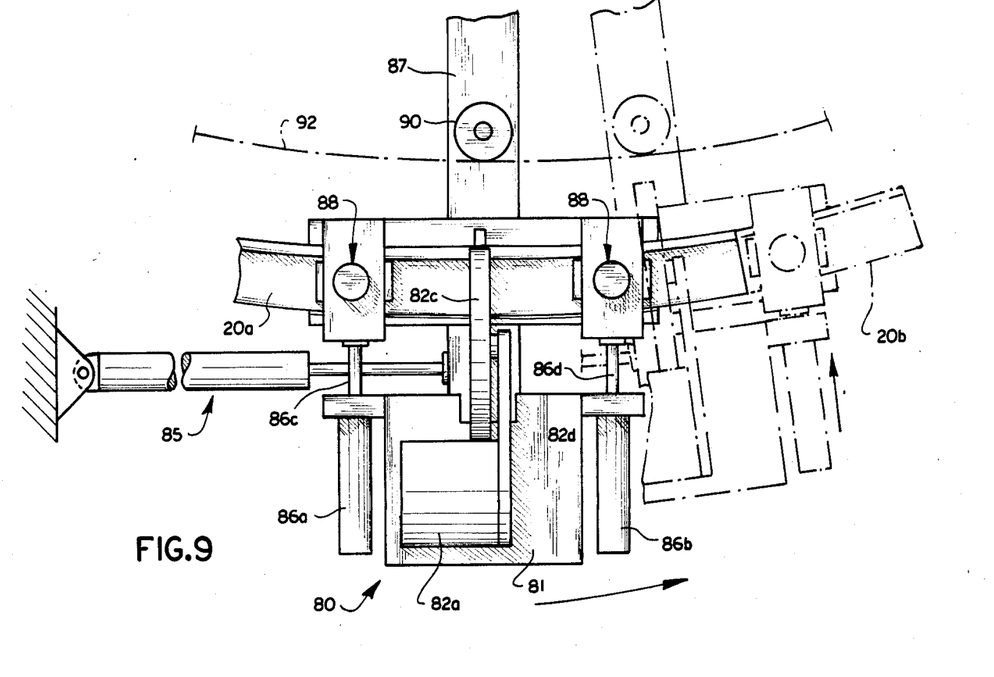
FIG. 9 is a plan view of a radial arm type saw device forming a portion of the machine of FIGS. 4 and 5.

FIG. 9 illustrates in greater detail a preferred form for the cutting station 80 schematically illustrated in FIGS. 4 and 5. The circular saw 82 (see FIG. 4) can be comprised of a drive motor 82a for rotating a circular saw blade 82b (see FIGS. 5 and 10), the saw blade 82b being partially covered by a shield 82c, a belt drive mechanism 82d interconnecting the drive motor 82a and the blade 82b. Radial movement of the saw blade 82b toward and away from the periphery of the turntable as provided by a pair of first and second air cylinders 86a, 86b that reciprocate relative to a pair of fixed piston rods 86c, 86d. Pivotal or arcuate movement of the saw blade 82b, at a rate corresponding to the advancing rate of the strip 20a, is provided by the arcuate travel drive cylinder 85 whose rate of movement is controlled by the velocity sensor 90 supported on the pivot arm 87 in turn supported by a pivot arm support 87a (see FIG. 5). As noted earlier, the air cyclinder 85 functions to swing the cutting station 80 back and forth while the air cylinders 86a and 86b provide radial movement of the rotating saw blade 82b.

Figure 10:
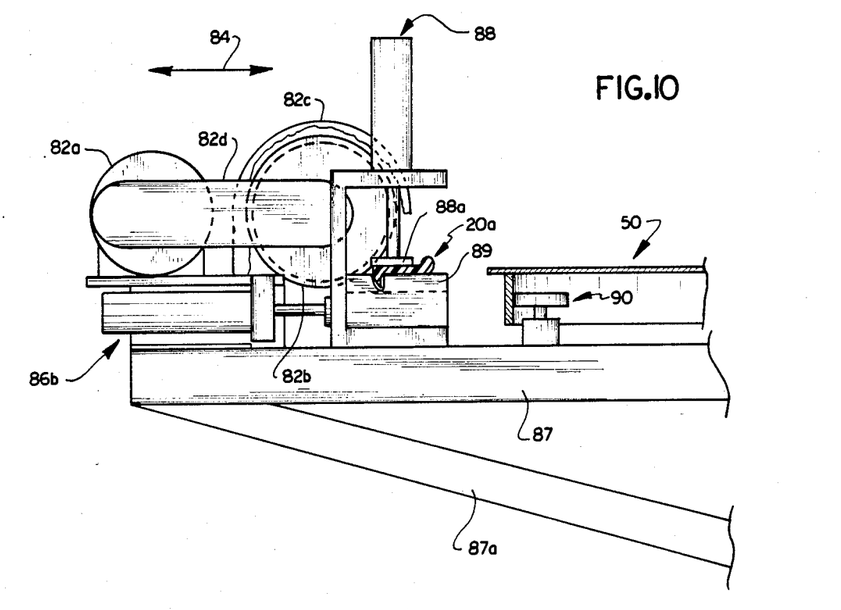
FIG. 10 is a side elevation view of the radial arm type saw device illustrated in FIG. 9.

With specific reference to FIG. 10, it can be seen that the saw blade 82b will move back and forth as illustrated by arrow 84, the saw blade when advancing towards the table 50 cutting completely through the strip 20a which is held against a strip support 89 by the pair of hold down clamps 88 (only one illustrated) having associated hold down clamp plates 88a. After the saw blade 82b has completely cut through the strip 20a, the saw blade is moved away from the table 50 and the clamping plate 88a are raised. A now cut section 20b (see FIG. 4) of the strip is pushed onto the receiving tray 45 by the advancing end of the strip 20a as the saw cutting station 80 pivots clockwise about the axis of rotation 50a to its starting position as illustrated in FIG. 4 wherein a cutting cycle is repeated.

It can be seen that a method and means has been provided for providing drum handling rings having a preferred inverted frustoconical geometry as illustrated and discussed with regard to FIG. 3. It is to be recognized that other geometrical configurations of ring structures formed from plastic or other deformable material could be provided in accordance with the present invention. Also, while the present invention has particular applications of the formation of rings from generally flat strip stock having an asymmetrical cross section, stock having symmetrical cross sections could also be utilized to form rings having a desired geometry. Also, coordinated control of the various moving elements of the machine illustrated in the drawing can be provided by electromechanical means or electronic means, or a combination thereof. Also, it is contemplated that the clamping plate 61 could be moved radially inwardly to provide more curvature to the strip 20a if such is desired, i.e. the strip would not be clamped to the table at its periphery but rather at a radially inboard location.

Although the preferred embodiment of this invention has been shown and described, it should be understood that various modifications and rearrangements of the parts may be resorted to without departing from the scope of the invention as disclosed and claimed herein.

What is claimed is:

1. An apparatus for use in forming a plurality of curved strips from an extruded strip of heated, deformable thermoplastic material advancing along its longitudinal extent toward said apparatus, said curved strips being subsequently used to form rings of a preferred geometry, said apparatus comprising:

a rotatable turntable;

retaining means located on one side of the turntable for retaining an advancing end portion of said moving strip in a predetermined curved position on said one side of the turntable as it rotates, said retained portion of predetermined curvature being radially spaced from the axis of rotation of the turntable;

means for cooling the retained curved portion of the strip so that it will maintain, for at least a predetermined time period, its curved condition when no longer retained in position on said turntable; and means for cutting predetermined lengths from said cooled curved portion as it is released from its retained position on said turntable.

2. An apparatus according to claim 1 including means for rotatably driving said turntable wherein said rotating turntable pulls on said advancing strip to place it in tension to a predetermined degree.

3. An apparatus according to claim 1 wherein said means for cooling includes blower means for providing an air stream that impinges on the retained curved portion of strip.

4. An apparatus according to claim 1 wherein said retaining means is constituted by a plurality of movable clamps arranged in circular fashion about the axis of rotation of the turntable, the clamps being sequentially actuated to clamp said strip to said table at a fixed feed location and to unclamp said strip from said table at a fixed exit location generally diametrically opposed to said feed location.

5. An apparatus according to claim 4 including guide means positioned generally at said exit location for guiding the curved end portion of the strip away from the turntable toward said means for cutting.

6. An apparatus according to claim 5 wherein said means for cutting includes a moving saw blade engageable with that portion of the strip advancing from the guide means toward the means for cutting, said means for cutting further including first means for moving said saw blade transversely through said moving strip, the saw blade cutting across and completely through the strip.

7. An apparatus according to claim 6 including second means for moving said saw blade in the direction of movement of the strip portion undergoing cutting at a speed equal to the speed of strip movement so that binding of the saw blade during cutting is precluded.

8. An apparatus for use in forming a plurality of curved strips from an extruded, generally flat strip of heated, deformable thermoplastic material advancing along its longitudinal extent toward the apparatus, said curved strips being subsequently used to form rings of a preferred geometry, said apparatus comprising:

a rotatably driven, horizontal turntable having a top side, a bottom side, and a circular periphery;

a plurality of movable clamps equidistantly spaced about the periphery of the turntable and mounted thereto, each clamp including a platelike member having a face portion movable toward the top side of the turntable, the platelike member being movable between a raised position and a lowered position, said face portion lying generally in a horizontal plane when the platelike member is at its lowered position, each platelike member at its lowered position functioning in part to retain an advancing end portion of said moving strip against the top side of the turntable wherein the retained portion has a degree of curvature generally corresponding to the curvature of the periphery of the turntable, the said end portion of the strip being sandwiched between the face portions of the lowered platelike members and the top side turntable, the face portions of the platelike members and the top side of the turntable engaging opposed generally flat parallel side portions of the advancing end of the strip;

air blower means providing an air stream impinging on the clamped portion of the strip to cool it from its heated condition wherein it will maintain, for at least a predetermined time period, its curved condition when no longer clamped to said turntable; and means for cutting predetermined lengths from said cooled curved portion after it is released from its clamped position on said turntable.

9. An apparatus according to claim 8 wherein said platelike clamp members are foraminous to allow air flow through said clamp members to effect cooling thereof.

10. An apparatus according to claim 8 wherein at least that portion of the top side of the turntable engageable with the strip is foraminous to allow air flow therethrough.

11. An apparatus according to claim 8 including fixed cam means, each of said movable clamps being controlled by means including a cam follower engageable with the cam means as the turntable with the clamps mounted thereto rotates, said cam means causing sequential lowering and raising of the clamp as the turntable rotates, the clamps being lowered at a feed location where the advancing strip engages the turntable, the clamps being raised at a generally diametrically opposed exit location wherein the advancing strip disengages from the turntable.

12. An apparatus according to claim 8 wherein each clamp is moved by an associated air driven piston member.

* * * * *